US009456046B2

(12) United States Patent
Singh et al.

(10) Patent No.: US 9,456,046 B2
(45) Date of Patent: Sep. 27, 2016

(54) DYNAMIC GENERATION OF PROXY CONNECTIONS

(71) Applicant: HONEYWELL INTERNATIONAL INC., Morristown, NJ (US)

(72) Inventors: Praveen Kumar Singh, Karnataka (IN); Rod Stein, Edmonton (CA); Paras Rajkumar Jatkar, Karnataka (IN); Mohit Kumar Agarwal, Karnataka (IN); Manibhushan Reddy Pottem, Karnataka (IN); Madhavan Sundara, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 165 days.

(21) Appl. No.: 14/273,185

(22) Filed: May 8, 2014

(65) Prior Publication Data

US 2015/0326683 A1 Nov. 12, 2015

(51) Int. Cl.
*G06F 15/16* (2006.01)
*H04L 29/08* (2006.01)
*H04L 29/06* (2006.01)
*G06F 9/54* (2006.01)

(52) U.S. Cl.
CPC ............ *H04L 67/28* (2013.01); *G06F 9/54* (2013.01); *H04L 67/1097* (2013.01); *H04L 67/141* (2013.01); *H04L 67/42* (2013.01)

(58) Field of Classification Search
USPC .................. 709/203, 220, 227, 221, 222
See application file for complete search history.

(56) References Cited

U.S. PATENT DOCUMENTS

| 7,873,164 | B1 * | 1/2011 | Wertenbruch | ...... H04L 12/2898 380/255 |
| 2008/0307219 | A1 | 12/2008 | Karandikar | |
| 2010/0318665 | A1 | 12/2010 | Demmer et al. | |
| 2010/0322236 | A1 * | 12/2010 | Vimpari | .............. H04L 12/1886 370/389 |
| 2012/0284425 | A1 | 11/2012 | Choi et al. | |
| 2015/0200817 | A1 * | 7/2015 | Mulchandani | .......... H04L 67/00 709/223 |

OTHER PUBLICATIONS

Definition of "proxy server", Wikipedia, Oct. 31, 2014, pp. 1-12.

* cited by examiner

*Primary Examiner* — Lan-Dai T Truong
(74) *Attorney, Agent, or Firm* — Jetter & Associates, P.A.

(57) ABSTRACT

A system and method which dynamically generate proxy connections in a communication system. A client computer system has a processor that is coupled by a communications path including at least one proxy connection to a first target server. An algorithm for dynamically generating proxy connections is stored in machine readable storage. The algorithm is implemented by the processor causing the client computer system to execute generating an additional one of the proxy connections in response to receiving a request and to generate a program identifier which identifies the additional proxy connection. The processor determines if the program identifier is a unique program identifier. If the program identifier is not unique, the processor changes the identifier to render it a modified program identifier so that it is unique and stores the program identifier or the modified program identifier to a configuration file at the client computer system.

20 Claims, 4 Drawing Sheets

DYNAMIC GENERATION OF PROXY CONNECTIONS

FIELD

Disclosed embodiments relate to computers used with industrial hardware devices and more specifically relate to the dynamic generation of proxy connections in a computer network.

BACKGROUND

Open Process Control (OPC) is a software interface standard that allows WINDOWS programs to communicate between OPC enabled servers that have implemented an OPC server client. One area that OPC enabled servers are used is in industrial hardware devices used in manufacturing plants and refineries. The acronym OPC comes from OLE (Object Linking and Embedding for Process Control). OLE is partially based on the WINDOWS component object model (COM) standard and OPC shares some common features with COM. OPC is implemented over a client/server network.

The OPC server contains a software program that converts the hardware communication protocols used by industrial hardware devices such as programmable logic controllers (PLC) into the OPC protocol. The OPC client software includes programs to connect to the industrial hardware devices such as a human-machine interface. The OPC client uses the OPC server to receive data and/or transmit commands to the industrial hardware devices. Each OPC enabled computer can have hundreds of server connections. Unfortunately, with large numbers of server connections, a problem or duplication in one or more server connections can cause problems such as a loss of data and receipt or transmission of incorrect data.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include a system for dynamically generating proxy connections in a communication system. A client computer system is communicatively coupled by a communication path to a first target server. The client computer system includes a processor connected to a storage device having a non-transitory machine readable storage medium. The storage device stores a proxy connection generation program. The client computer system is programmed to implement the proxy connection generation program. The client computer system generates additional proxy connections in response to receiving a request to generate additional proxy connections and generates a program identifier which identifies the additional proxy connection to the first target server for the additional proxy connection to connect to. The client computer system determines if the program identifier is a unique program identifier and if the program identifier is not unique, changes the program identifier to render it a modified program identifier so that it is unique. The client computer system stores the program identifier or the modified program identifier to a configuration file.

One disclosed embodiment comprises a method for dynamically generating proxy connections in a communication system. The method includes providing a client computer system including non-transitory machine readable storage. The client computer system includes at least one processor that is communicatively coupled by a communications path including at least one proxy connection to a first target server. An algorithm for dynamically generating proxy connections is stored in the machine readable storage. The algorithm is implemented by the processor causing the client computer system to execute generating an additional one of the proxy connections in response to receiving a request to generate an additional proxy connection and to generate a program identifier which identifies the additional proxy connection to the first target server for the additional proxy connection to connect to. The processor further executes the algorithm to determine if the program identifier is a unique program identifier. If the program identifier is not unique, the processor changes the identifier to render it a modified program identifier so that it is unique and stores the program identifier or the modified program identifier to a configuration file at the client computer system.

DETAILED DESCRIPTION

Figure 1:
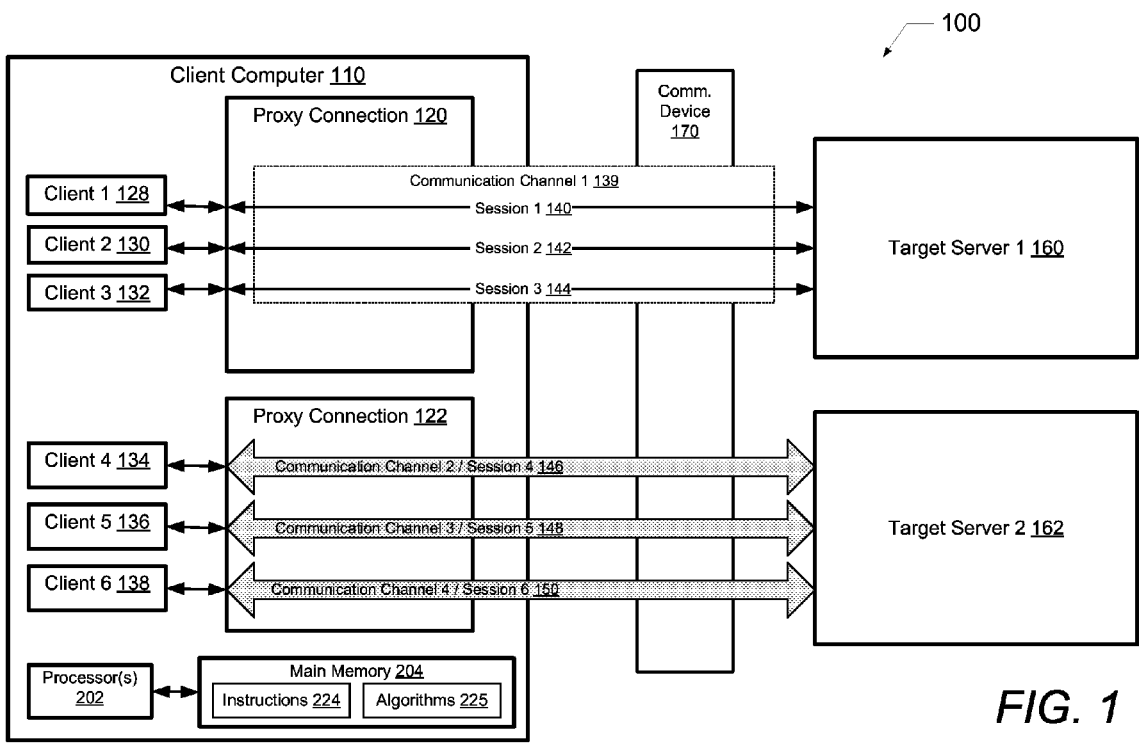
FIG. 1 is a block diagram of an example communication system, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments provide a method, system and computer program product for dynamically generating proxy connections in a communication system. In accordance with a disclosed embodiment, a client computer system is coupled by a communication path to a first target server. The client computer system includes a processor connected to a storage device having a non-transitory machine readable storage medium. The storage device stores a proxy connection generation program. The client computer system is programmed to implement the proxy connection generation program. The client computer system generates additional proxy connections in response to receiving a request to generate additional proxy connections and generates a program identifier which identifies the additional proxy connection to the first target server for the additional proxy connection to connect to. The client computer system determines if the program identifier is a unique program identifier and if the program identifier is not unique, changes the program identifier to render it a modified program identifier so that it is unique. The client computer system stores the program identifier or the modified program identifier to a configuration file at the client computer system.

FIG. 1 illustrates a block diagram of an example communication system 100. As shown in FIG. 1, communication system 100 comprises a client computer system 110 that is in communication with one or more target servers shown as target server 1 160 and target server 2 162 (collectively hereafter target servers 160 and 162) via a communication device 170. The client computer system 110 can be connected or networked to other target servers. In one embodiment, client computer system 110 is an OPC enabled computer that is running an OPC program. In a networked deployment, client computer system 110 can operate in the capacity of a client machine in a client-server network environment.

Client computer system 110 includes one or more processors 202 such as a central processing unit (CPU) and a main memory 204, which communicate with each other via a bus. Main memory 204 can store instructions 224 and/or algorithms 225 for execution by processor 202. Each target server 1 160 and target server 2 162 is also a computer system. Communication device 170 can be selected from a wide variety of communication devices such as devices having a direct link over a serial or parallel communications bus, a wireless connection, an internet connection, a wide area network connection or a remote link through one or more switches and/or routers.

Client computer system 110 further includes several clients including client 1 128, client 2, 130, client 3, 132, client 4 134, client 5 136 and client 6, 138 (collectively hereafter clients 128-138). Clients 128-138 access and exchange information with target servers 160 and 162. Proxy connections 120 and 122 act as intermediaries for requests from clients 128-132 seeking resources from target servers. While two proxy connections are shown, client computer system 110 can include hundreds of proxy connections. The proxy connections 120 and 122 evaluate requests for service from clients as a way to simplify and control complexity within communication system 100.

Proxy connection 120 is shown having a communication channel 1 139 with session 1 140, session 2 142 and session 3 144 all running simultaneously and independent of one another. Communication channel 1/session 1 140 communicatively couples client 1 128 to target server 1 160. Communication channel 1/session 2 142 communicatively couples client 2 130 to target server 1 160. Communication channel 1/session 3 144 communicatively couples client 3 132 to target server 1 160. While three sessions are shown running in proxy connection 120, the proxy connections 120 and 122 can each support hundreds of sessions.

Proxy connection 122 is shown having several communication channels including communication channel 2 running session 4 146, communication channel 3 running session 5 148 and communication channel 4 running session 6 150. Communication channel 2/session 4 146 communicatively couples client 4 134 to target server 2 162. Communication channel 3/session 5 148 communicatively couples client 5 136 to target server 2 162. Communication channel 4/session 6 150 communicatively couples client 6 138 to target server 2 162.

Significantly, as shown in FIG. 1, disclosed proxy connections 120 and 122 connect to only one target server at any given time. The respective proxy connections 120 and 122 thus operate as separate processes and they need not have any knowledge of each other. So whenever a user of the client computer system 110 configures a new server connection, a new proxy instance is automatically created for it and it runs as a separate and independent process.

Figure 2:
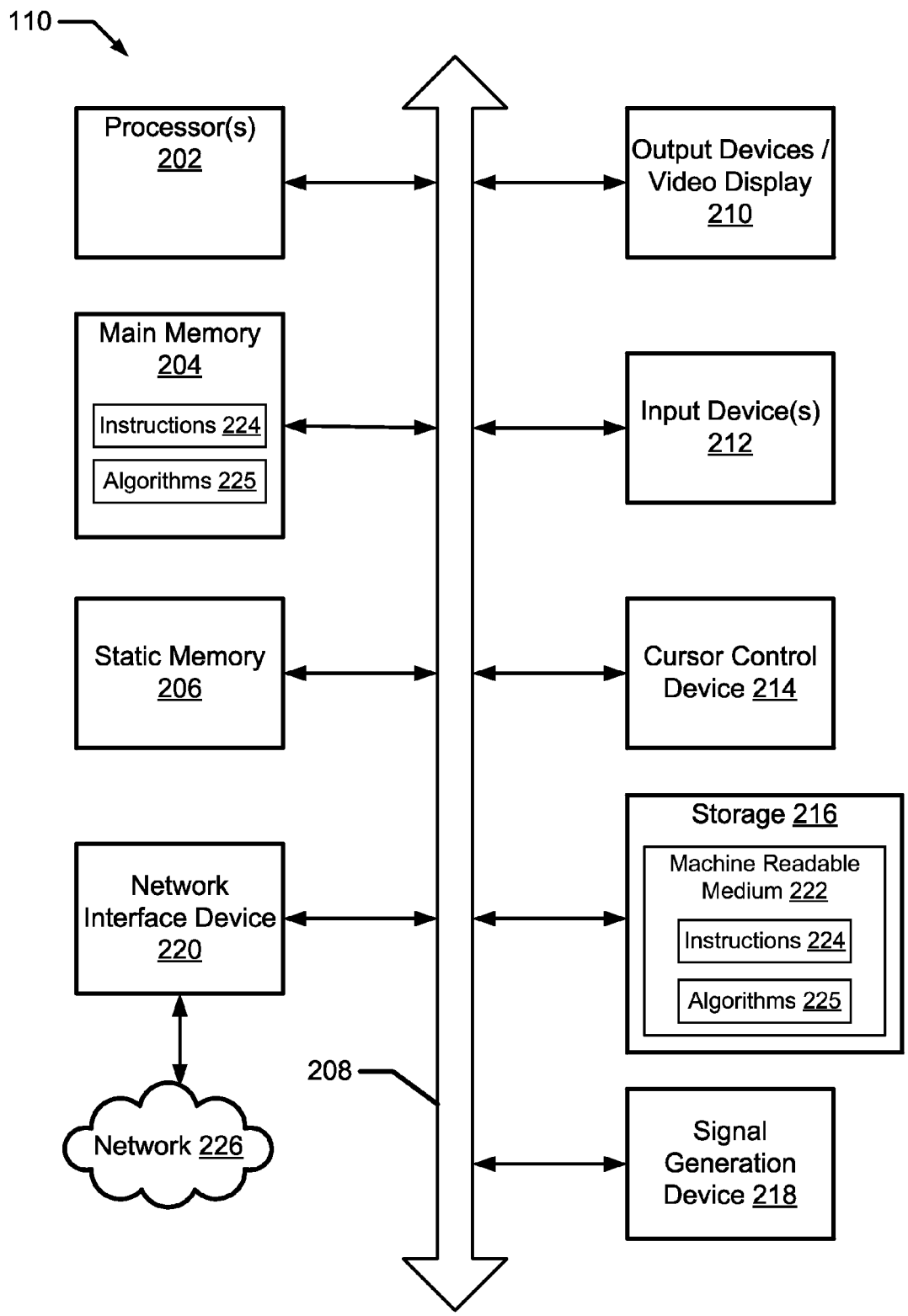
FIG. 2 is a block diagram of an example client computer system, according to an example embodiment.

FIG. 2 illustrates an example block diagram of client computer system 110 within which a set of instructions 224 and/or algorithms 225 can be executed causing the client computer system 110 to perform any one or more of the methods, processes, operations, applications, or methodologies discussed herein.

Client computer system 110 includes one or more processors 202 such as a central processing unit (CPU), a graphics processing unit (GPU) or both, a main memory 204 and a static memory 206, which communicate with each other via a system bus 208 which can represent a data bus and an address bus. Main memory 204 can store instructions 224 and/or algorithms 225 for execution by processor 202. The client computer system 110 further includes output devices such as a video display unit 210 and a signal generation device 218 (e.g., a speaker) which are connected to system bus 208. The client computer system 110 also has input devices such as an alphanumeric input device 212 (e.g., a keyboard) and a cursor control device 214 (e.g., a mouse) that are connected to system bus 208. A network interface device 220 is shown connected to an external communication network 226 to enable communication with the system bus 208.

A storage device 216 such as a hard drive or solid state drive is connected to and in communication with system bus 208. The storage device 216 includes a machine-readable medium 222 on which is stored one or more sets of software such as instructions 224 and/or algorithms 225 embodying any one or more of the methodologies or functions described herein. The instructions 224 and/or algorithms 225 can also reside, completely or at least partially, within the main memory 204 and/or within the processor 202 during execution thereof by the client computer system 110. The main memory 204 and the processor 202 also containing machine-readable media. The instructions 224 and/or algorithms 225 can further be transmitted or received over network 226 via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the computer system and that cause the computer system to perform any one or more of the methodologies shown in the various embodiments of the present invention. The term "machine-readable medium" shall accordingly be taken to include, but not be limited to, solid-state memories, optical and magnetic media, and carrier wave signals.

Figure 3:
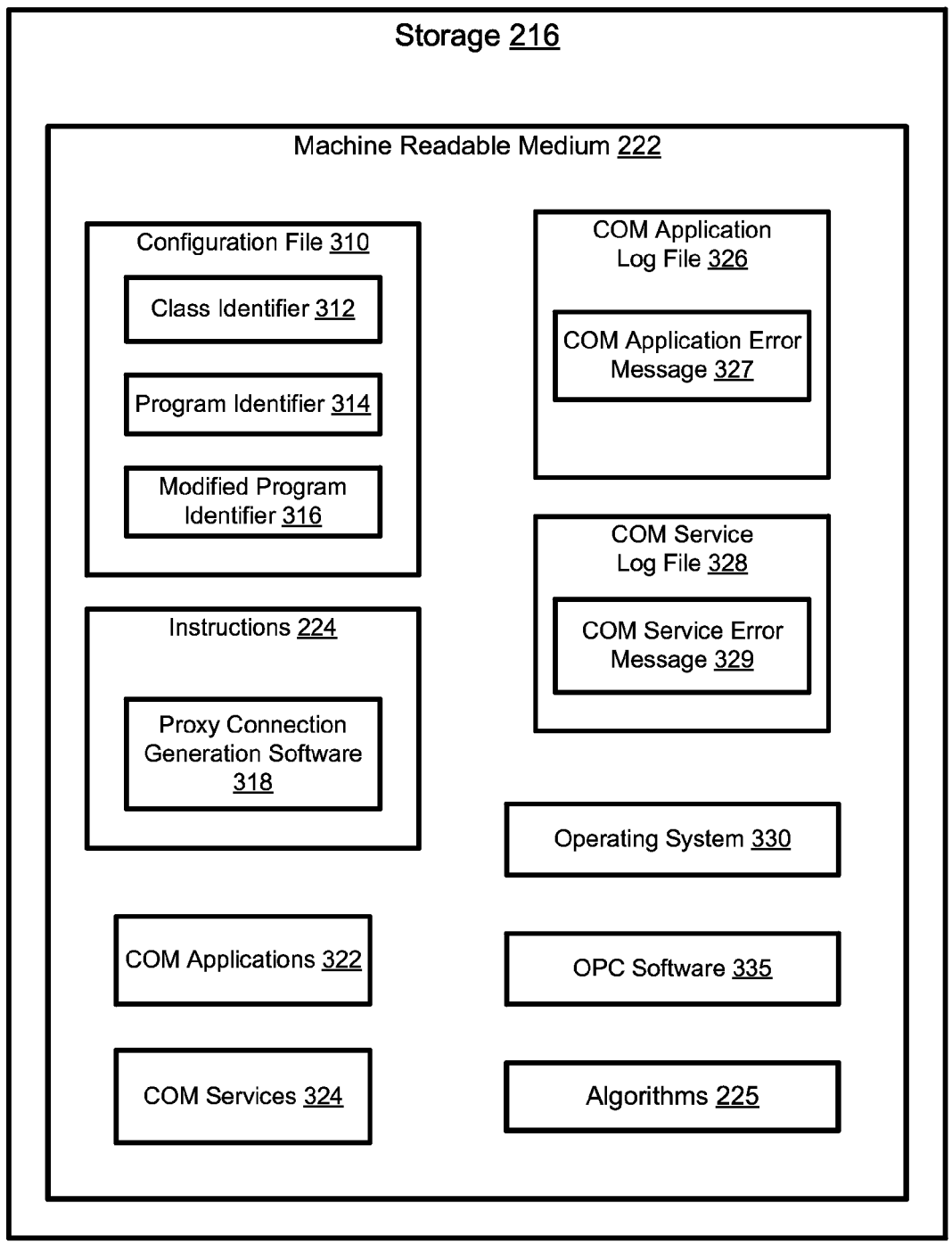
FIG. 3 is an example illustration of contents of a computer readable storage medium, according to an example embodiment.

With reference to FIG. 3, example contents of machine readable medium 222 stored within storage device 216 are shown. Machine readable medium 222 can store instructions 224 and/or algorithms 225 for execution by processor 202.

Instructions 224 can include a proxy connection generation software program 318 that when executed by processor 202 dynamically generates proxy connections 120, 122 to target servers 160 and 162. An operating system (O/S) 330 and OPC software 335 are also stored in machine readable medium 222. Operating system (O/S) 330 manages resources and provides common services for client computer system 110. The OPC software 335 enables communication with the hardware communication protocols used by industrial hardware devices such as programmable logic controllers (PLCs).

Machine readable medium 222 further can store one or more configuration files 310. Configuration file 310 includes one or more class identifiers 312, one or more program identifiers 314, and one or more modified program identifiers 316. Each proxy connection 120, 122 is identified by a class identifier 312 and a program identifier 314 or modified program identifier 316. The class identifier 312 is a type of globally unique identifier (GUID), which can in one particular embodiment be a 128-bit number that identifies an application. The program identifier 314 and modified program identifier 316 are a human friendly name that is mapped to and corresponds to the associated class identifier 312. Machine readable medium 222 further can store one or more COM applications 322 and one or more COM services 324. Machine readable medium 222 further can store one or more COM application log file 326 and one or more COM service log file 328. When a COM application encounters an error or has warnings while executing the application logic, a COM application error message 327 is generated and the message is logged in the COM application log file 326. Similarly COM services error messages 329 produced by COM services are logged in the COM service log file 328. COM application error messages 327 are stored in COM application log file 326. COM services error messages 329 are stored in COM services log file 328.

Figure 4:
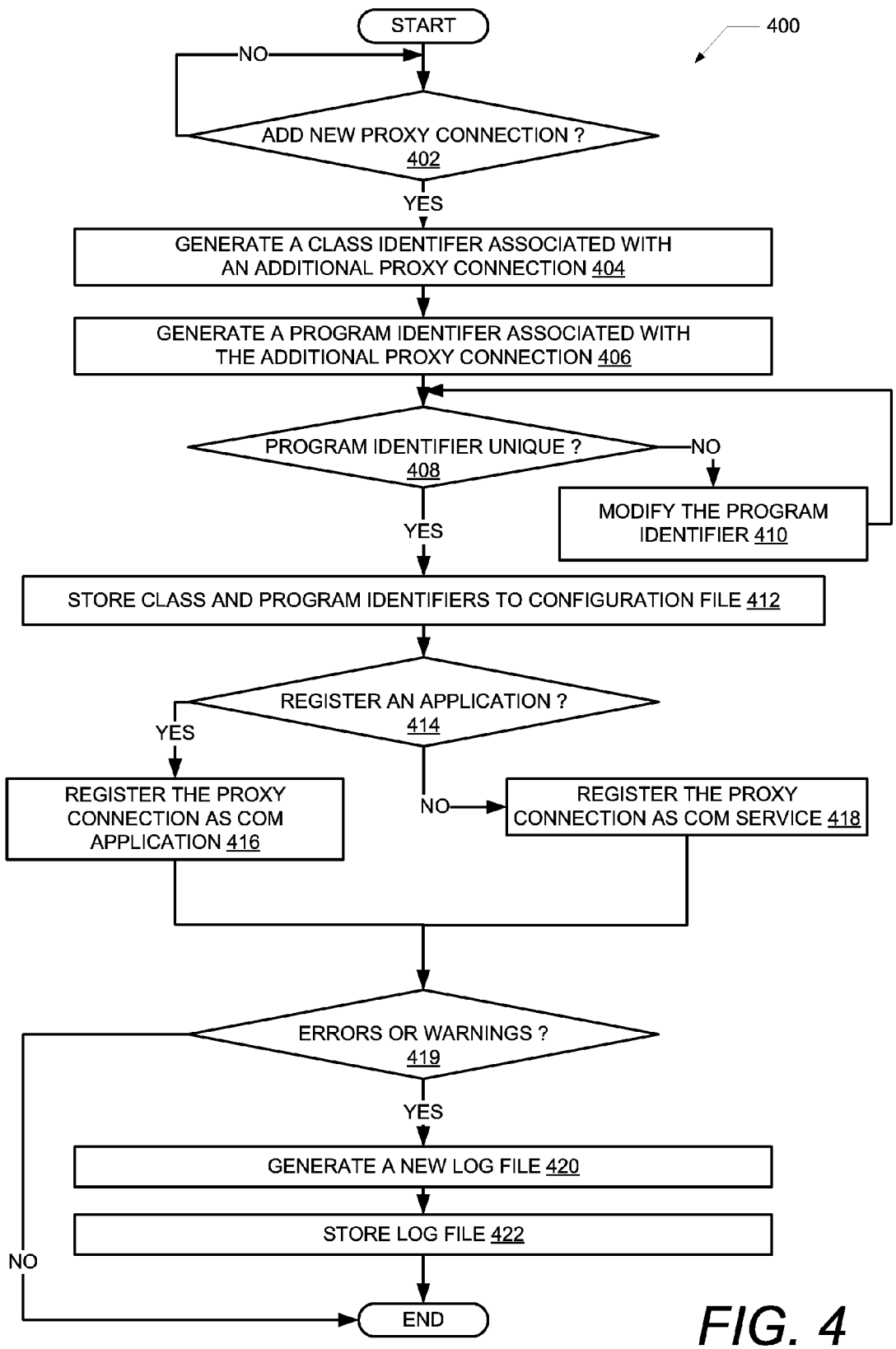
FIG. 4 is a flow chart that shows steps in an example method of dynamically generating proxy connections, according to an example embodiment.

FIG. 4 is a flow chart showing steps in an exemplary method 400 for dynamically generating proxy connections in a communication system, according to an example embodiment. With reference to FIGS. 1-4, method 400 can be implemented via the execution of instructions 224 and/or algorithms 225 by processor 202 within the client computer system 110. Method 400 begins at the start block and proceeds to decision block 402. At decision block 402, processor 202 determines if a request for a new additional proxy connection (i.e. proxy connection 120 or 122) has been received. The request for a new proxy connection can be detected from a user or can originate from another software program. In response to no request for a new proxy connection being received, processor 202 continues to determine if a request for a new proxy connection has been received at decision block 402.

In response to a request for an additional proxy connection being received, processor 202 generates a class identifier 312 associated with the additional proxy connection at block 404 and generates a program identifier 314 associated with the additional proxy connection at block 406. At decision block 408, processor 202 determines if the program identifier 314 associated with the additional proxy connection is a unique program identifier. In response to the program identifier 314 associated with the additional proxy connection not being a unique program identifier, processor 202 modifies or changes the program identifier 314 at block 410 so that the modified program identifier 316 associated with the additional proxy connection is a unique program identifier. In one embodiment, a number is added to the program identifier 314 in an attempt to make it a modified program identifier 316 that is unique. In another embodiment, a new program identifier is selected from a predetermined list of program identifiers. After the program identifier 314 has been changed to a modified program identifier 316 at block 410, method 400 returns to decision block 408 to re-check and confirm that the modified program identifier 316 is unique.

In response to the program identifier 314 or the modified program identifier 316 associated with the additional proxy connection being a unique program identifier, processor 202 stores the class identifier 312 and either the program identifier 314 or the modified program identifier 316 associated with the additional proxy connection to a configuration file 310 at block 412. At decision block 414, processor 202 determines if the additional proxy connection is to be registered as an application. In response to the additional proxy connection being registered as an application, processor 202 registers the additional proxy connection as a COM application 322 at block 416. At block 419, processor 202 determines if any errors or warnings occur during execution of the COM application 322. In response to no errors or warnings occurring, method 400 ends. In response to the occurrence of an error or warning, processor 202 generates a new COM application log file 326 containing one or more COM application error messages 327 at block 420 and stores the new COM application log file 326 to storage 216 in a machine readable medium 222 at block 422. Method 400 then ends.

In response to the additional proxy connection not being registered as an application, processor 202 registers the additional proxy connection as a component object model (COM) service 324 at block 418. At block 419, processor 202 determines if any errors or warnings occur during execution of the COM service 324. In response to no errors or warnings occurring, method 400 ends. In response to the occurrence of an error or warning, processor 202 generates a new COM service log file 328 containing the COM service error message 329 at block 420 and stores the new COM service log file 328 to storage 216 in a machine readable medium 222 at block 422. Method 400 then ends.

Method 400 allows for the dynamic generation of unique additional proxy connections 120, 122 in a communication network. Each of the additional proxy connections is identified by a unique program identifier 314/316 such that each client has its own unique communication channel to a target server. Each class identifier 312 and program identifier 314/316 is associated with only one client and one target server. Having unique identifiers ensures that the failure of one proxy connection does not disturb other proxy connections that may be simultaneously running.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claimed is:

1. A method, comprising:
providing a communications system including an Open Process Control (OPC) client computer system having non-transitory machine readable storage, said client computer system including at least one processor communicatively coupled by a communications path including at least one (OPC) proxy connection having a plurality of communication channels to a first target OPC server, wherein an algorithm for dynamically generating said OPC proxy connections is stored in said machine readable storage, said algorithm implemented by said processor causing said OPC client computer system to execute:
generating an additional one of said OPC proxy connections (additional OPC proxy connection) having two or more of said communication channels in response to receiving a request to generate said additional OPC proxy connection and a program identifier which identifies said additional OPC proxy connection to said first target OPC server for said additional OPC proxy connection to connect to;
determining if said program identifier is a unique program identifier; wherein if said program identifier is not unique, changing said program identifier to render it a modified program identifier so that it is unique, and
storing said program identifier or said modified program identifier to a configuration file at said OPC client computer system.

2. The method of claim 1, wherein if said additional OPC proxy connection is to be added, generating a class identifier associated with said additional OPC proxy connection.

3. The method of claim 2, wherein said class identifier is stored to said configuration file at said OPC client computer system.

4. The method of claim 1, wherein if said program identifier is said unique program identifier, storing said unique program identifier to said configuration file.

5. The method of claim 1, wherein if said program identifier is said unique program identifier, said OPC client computer system determining if said additional OPC proxy connection is to be registered as a component object model (COM) application; and if said additional OPC proxy connection is to be registered as said COM application, said OPC client computer system registering said additional OPC proxy connection as said COM application.

6. The method of claim 1, wherein if said program identifier is said unique program identifier, said OPC client computer system determining if said additional OPC proxy connection is to be registered as a component object model (COM) application; if said additional OPC proxy connection is not to be registered as said COM application, said OPC client computer system registering said additional OPC proxy connection as a COM service.

7. The method of claim 6, wherein a first log file containing either a COM application error message or a COM service error message is generated; and storing said first log file at said OPC client computer system.

8. A computer program product, comprising:
a non-transitory data storage medium that includes program instructions executable by a processor to enable said processor to execute a method of dynamically generating Open Process Control (OPC) proxy connections having a plurality of communication channels in a communication system, said communication system including an OPC client computer system communicatively coupled by a communication path including at least one of said (OPC) proxy connections to a first target OPC server, said computer program product comprising:
code for generating an additional one of said OPC proxy connections (additional OPC proxy connection) having two or more of said communication channels in response to receiving a request to generate said additional OPC proxy connection;
code for generating a program identifier which identifies said additional OPC proxy connection to said first target OPC server for said additional OPC proxy connection to connect to;
code for determining if said program identifier is a unique program identifier; wherein if said program identifier is not unique, changing said program identifier to render it a modified program identifier so that it is unique; and
code for storing said program identifier or said modified program identifier to a configuration file at said OPC client computer system.

9. The computer program product of claim 8, wherein if said additional OPC proxy connection is to be added, said computer program product further comprises code for generating a class identifier associated with said additional OPC proxy connection.

10. The computer program product of claim 9, wherein said class identifier is stored to said configuration file at said OPC client computer system.

11. The computer program product of claim 8, wherein if said program identifier is said unique program identifier, storing said unique program identifier to said configuration file.

12. The computer program product of claim 8, wherein if said program identifier is said unique program identifier, said computer program product further comprises:
code for determining if said additional OPC proxy connection is to be registered as a component object model (COM) application; and
if said additional OPC proxy connection is to be registered as said COM application, code for registering said additional OPC proxy connection as said COM application.

13. The computer program product of claim 8, wherein if said program identifier is said unique program identifier, said computer program product further comprises:

code for determining if said additional OPC proxy connection is to be registered as a component object model (COM) application; and if said additional OPC proxy connection is not to be registered as said COM application, code for registering said additional OPC proxy connection as a COM service.

14. The computer program product of claim 13, further comprising code for generating a first log file containing either a COM application error message or a COM service error message; and code for storing said first log file at said OPC client computer system.

15. A system for dynamically generating proxy connections in a communication system comprising:

an Open Process Control (OPC) client computer system communicatively coupled by a communication path including least one OPC proxy connection having a plurality of communication channels to a first target OPC server; said OPC client computer system including a processor connected to a storage device having a non-transitory machine readable storage medium; wherein said storage device stores an OPC proxy connection generation program and said OPC client computer system is programmed to implement said OPC proxy connection generation program, wherein said OPC client computer system, generates an additional one of said OPC proxy connections (additional proxy connection) having two or more of said communication channels in response to receiving a request to generate said additional OPC proxy connections;

generates a program identifier which identifies said additional OPC proxy connection to said first target OPC server for said additional proxy connection to connect to;

determines if said program identifier is a unique program identifier; wherein if said program identifier is not unique, changes said program identifier to render it a modified program identifier so that it is unique; and stores said program identifier or said modified program identifier to a configuration file at said OPC client computer system.

16. The system of claim 15, wherein said OPC client computer system generates a class identifier associated with said additional OPC proxy connection, if said additional OPC proxy connection is to be added.

17. The system of claim 16, wherein said class identifier is stored to said configuration file at said OPC client computer system.

18. The system of claim 15, wherein said OPC client computer system stores said unique program identifier to said configuration file, if said program identifier is said unique program identifier.

19. The system of claim 15, wherein if said program identifier is said unique program identifier, said OPC client computer system determines if said additional proxy connection is to be registered as a component object model (COM) application and if said additional OPC proxy connection is to be registered as said COM application, said OPC client computer system registers said additional OPC proxy connection as said COM application.

20. The system of claim 15, wherein if said program identifier is said unique program identifier, said OPC client computer system determines if said additional OPC proxy connection is to be registered as a component object model (COM) application and if said additional OPC proxy connection is not to be registered as said COM application, said OPC client computer system registers said additional OPC proxy connection as a COM service.

* * * * *